US012732374B2

(12) United States Patent
Sakib et al.

(10) Patent No.: US 12,732,374 B2
(45) **Date of Patent: *Sep. 8, 2026**

(54) HARDWARE VIRTUALIZED TPM INTO VIRTUAL MACHINES

(71) Applicant: Microsoft Technology Licensing, LLC, Redmond, WA (US)

(72) Inventors: Md. Nazmus Sakib, Seattle, WA (US); Ronald Aigner, Redmond, WA (US); Ling Tony Chen, Bellevue, WA (US); Peter David Waxman, Seattle, WA (US); David Guy Weston, Seattle, WA (US); Bryan David Kelly, Carnation, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 41 days.

This patent is subject to a terminal disclaimer.

(21) Appl. No.: 18/813,160

(22) Filed: Aug. 23, 2024

(65) Prior Publication Data

US 2025/0023735 A1 Jan. 16, 2025

Related U.S. Application Data

(63) Continuation of application No. 17/401,181, filed on Aug. 12, 2021, now Pat. No. 12,101,410.

(51) Int. Cl.

| | |
|---|---|
| ***H04L 9/32*** | (2006.01) |
| ***G06F 9/455*** | (2018.01) |
| ***H04L 9/08*** | (2006.01) |

(52) U.S. Cl.

CPC ........ *H04L 9/3234* (2013.01); *G06F 9/45558* (2013.01); *H04L 9/083* (2013.01); *G06F 2009/45587* (2013.01)

(58) Field of Classification Search

CPC ... H04L 9/3234; H04L 9/083; G06F 9/45558; G06F 2009/45587; G06F 21/72; G06F 21/57

See application file for complete search history.

(56) References Cited

U.S. PATENT DOCUMENTS

| | | | | |
|---|---|---|---|---|
| 8,074,262 | B2 * | 12/2011 | Scarlata | H04L 63/0823 726/4 |
| 9,189,653 | B2 * | 11/2015 | Thom | G06F 21/57 |

(Continued)

OTHER PUBLICATIONS

Communication under Rule 71(3) EPC received for EP Application No. 22748133.0, mailed on Nov. 14, 2025, 8 Pages.

(Continued)

*Primary Examiner* — Mohammed Waliullah

(57) ABSTRACT

Methods, systems, apparatuses, and computer-readable storage mediums described herein enable executable code of a hardware security platform (HSP) circuit to communicate with a hypervisor in a separate processor. The hypervisor generates and manages virtual machines. The HSP code comprises trusted platform module (TPM) logic, that processes TPM commands received via the hypervisor, and in response to the processing, communicates security information (e.g., measurements, keys, authorization data) with the virtual machines via the hypervisor. The TPM logic receives security information related to a virtual machine from the hypervisor and stores the security information in non-volatile memory of the HSP circuit, where security information from a particular VM is distinguishable from security information from another VM in the HSP memory. The hypervisor (and VMs) communicate via a network fabric with the HSP circuit within an SOC, or the HSP may reside on a discrete chip and communicate via a secure encrypted channel.

20 Claims, 9 Drawing Sheets

(56) References Cited

U.S. PATENT DOCUMENTS

| | | | | |
|---|---|---|---|---|
| 2005/0210467 | A1* | 9/2005 | Zimmer | G06F 9/45558 718/1 |
| 2011/0167503 | A1* | 7/2011 | Horal | G06F 21/1011 726/33 |
| 2012/0266252 | A1* | 10/2012 | Spiers | H04L 9/3247 726/26 |
| 2017/0078279 | A1* | 3/2017 | Thom | H04L 63/0853 |
| 2019/0007378 | A1* | 1/2019 | Jowett | G06F 9/45558 |
| 2019/0163898 | A1* | 5/2019 | Clebsch | H04L 63/126 |
| 2021/0271502 | A1* | 9/2021 | Elliott | G06F 1/3203 |
| 2022/0200806 | A1* | 6/2022 | Grobelny | H04L 9/0897 |

OTHER PUBLICATIONS

Decision to Grant a European patent pursuant to Article 97(1) received in European Application No. 22748133.0, mailed on Jan. 22, 2026, 2 Pages.

* cited by examiner

SOC 102

CPU 104

VM-1 110A
(OS, Applications)

VM-2 110B
(OS, Applications)

...

Hypervisor 112

Transport Fabric 140

Security Information,
Commands

HSP Circuit 106

HSP Processor(s)
120

130 RAM

TPM Logic
122

132 Non-Volatile Memory

VM-1 Security
Information
124A

VM-2 Security
Information
124B

700

702: The TPM logic may receive, from the hypervisor, a sequence of instantiation measurements related to the first virtual machine of the one or more virtual machines 704: The TPM logic may store, in non-volatile memory of the HSP circuit, each measurement of the sequence of instantiation measurements related to the first virtual machine as a measurement extension relative to a prior measurement of the sequence

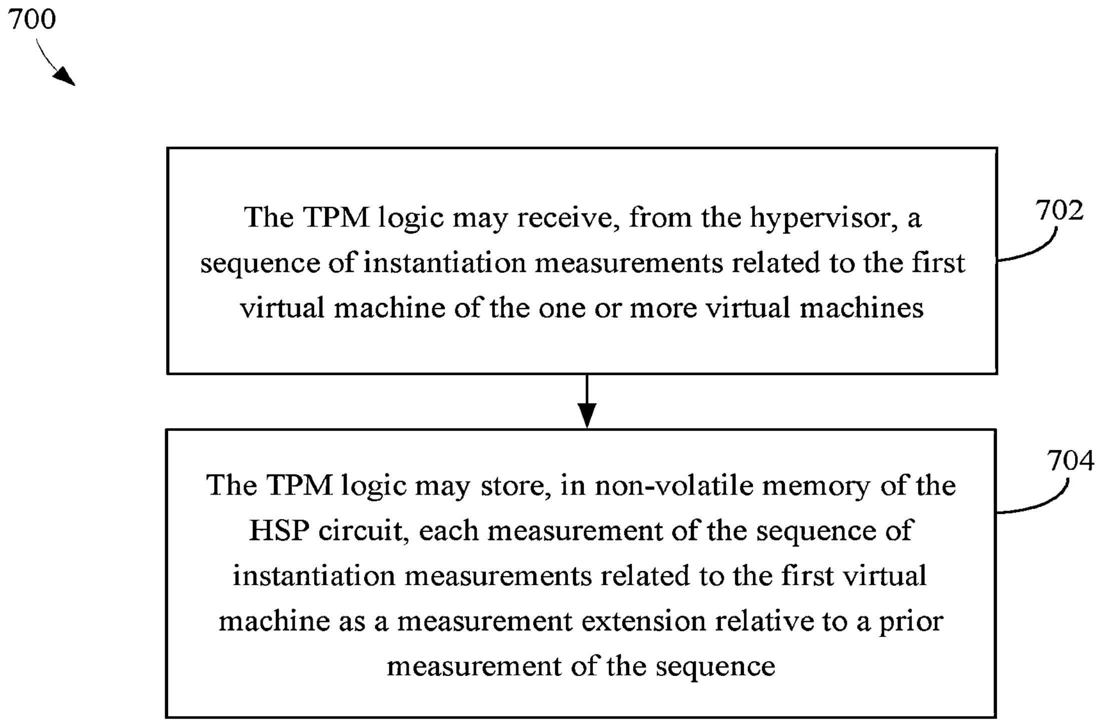

TPM logic provides attestation for a configuration state of the first virtual machine to the first virtual machine based on instantiation measurements related to the HSP executable code, the TPM logic, the hypervisor, and the first virtual machine stored in the one or more memory devices of the HSP circuit as the security information related to the first virtual machine

904

TPM logic provides an encryption key to the first virtual machine in response to receiving correct authorization data from the first virtual machine, wherein the encryption key and a value of the authorization data are stored in the one or more memory devices of the HSP circuit as the security information related to the first virtual machine

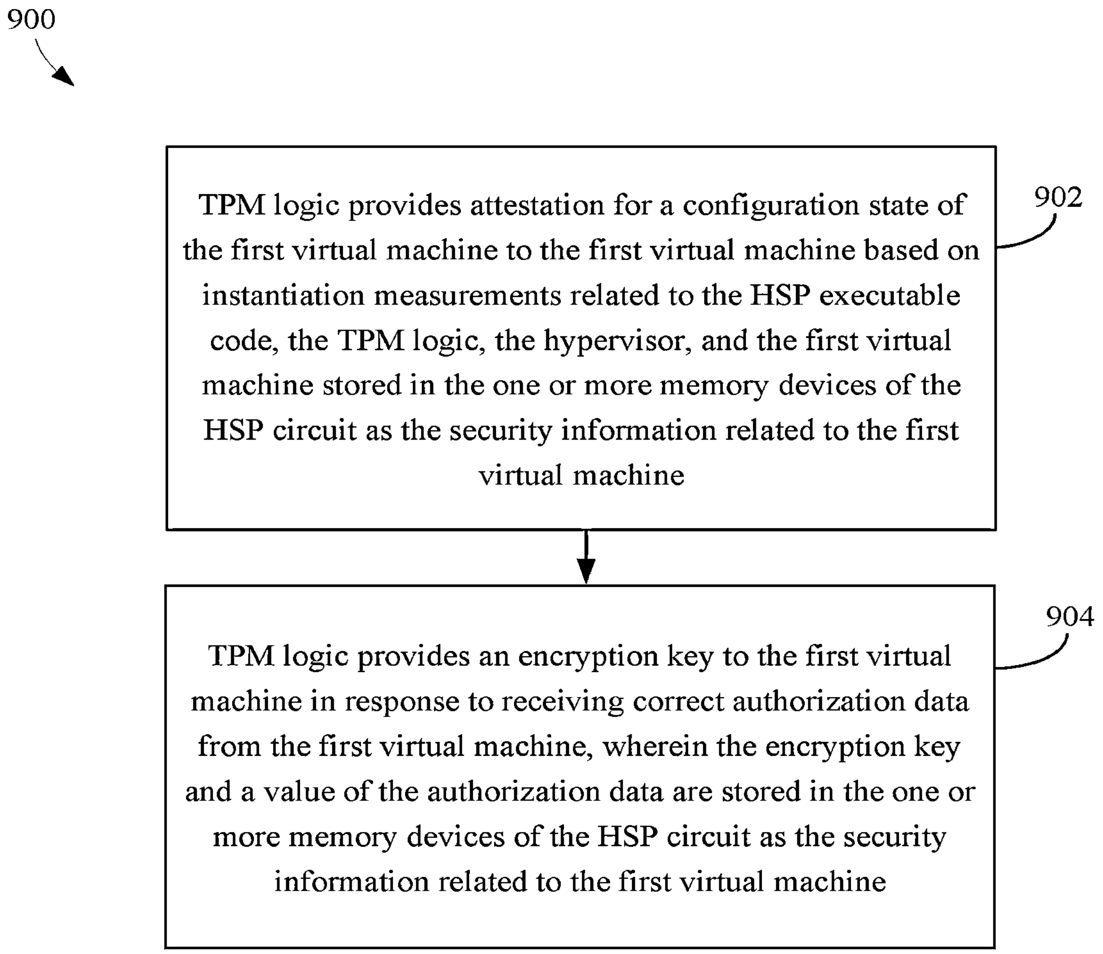

FIG. 9

HARDWARE VIRTUALIZED TPM INTO VIRTUAL MACHINES

CROSS-REFERENCE TO RELATED APPLICATIONS

This application is a continuation of U.S. patent application Ser. No. 17/401,181 filed Aug. 12, 2021, entitled "Hardware Virtualized TPM into Virtual Machines," which is incorporated herein by reference in its entirety.

BACKGROUND

Virtual machines (VMs) may be utilized in most types of devices comprising computing technology (e.g., host machines) including a central processing unit (CPU) in laptop or a cloud computing platform. A hypervisor may initialize and manage VMs on the host machine. The VMs may utilize a trusted platform module (TPM) implemented at the hypervisor layer to provide attestation and data protection support. TPM data related to the virtual machines (e.g., cryptographic keys, measurements, and authorization data such as a personal identification numbers (PIN)) may be stored in the hypervisor. For example, a TPM may release a cryptographic key for use in a VM when a correct PIN is provided by a user of the VM. In some systems, VM boot measurements may be stored in the hypervisor. Boot configuration logs (e.g., trusted computing group (TCG) logs or measured boot logs) may comprise measurements that identify which files were loaded and/or run during the boot process of a device or a VM.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage media described herein provide a hardware security platform (HSP) circuit. The HSP circuit comprises one or more processors and one or more memory devices, where the one or more memory devices store program code to be executed by the one or more processors. The program code comprises HSP executable code configured to communicate with a hypervisor. The hypervisor is configurable to generate and manage one or more virtual machines. The program code further comprises trusted platform module (TPM) logic, which is configured to process TPM commands received via the hypervisor. In response to the processing, the TPM logic may communicate security information with the one or more virtual machines via the hypervisor. The TPM logic is further configured to receive, from the hypervisor, security information related to a first virtual machine of the one or more virtual machines, and store the security information related to the first virtual machine in non-volatile memory of the HSP circuit.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 7 shows a flowchart of a method for storing instantiation measurements related to a virtual machine in persistent memory of an HSP circuit, according to an example embodiment.

FIG. 9 shows a flowchart of a method for providing attestation for a virtual machine and providing an encryption key to the virtual machine, according to an example embodiment

Figure 1A:
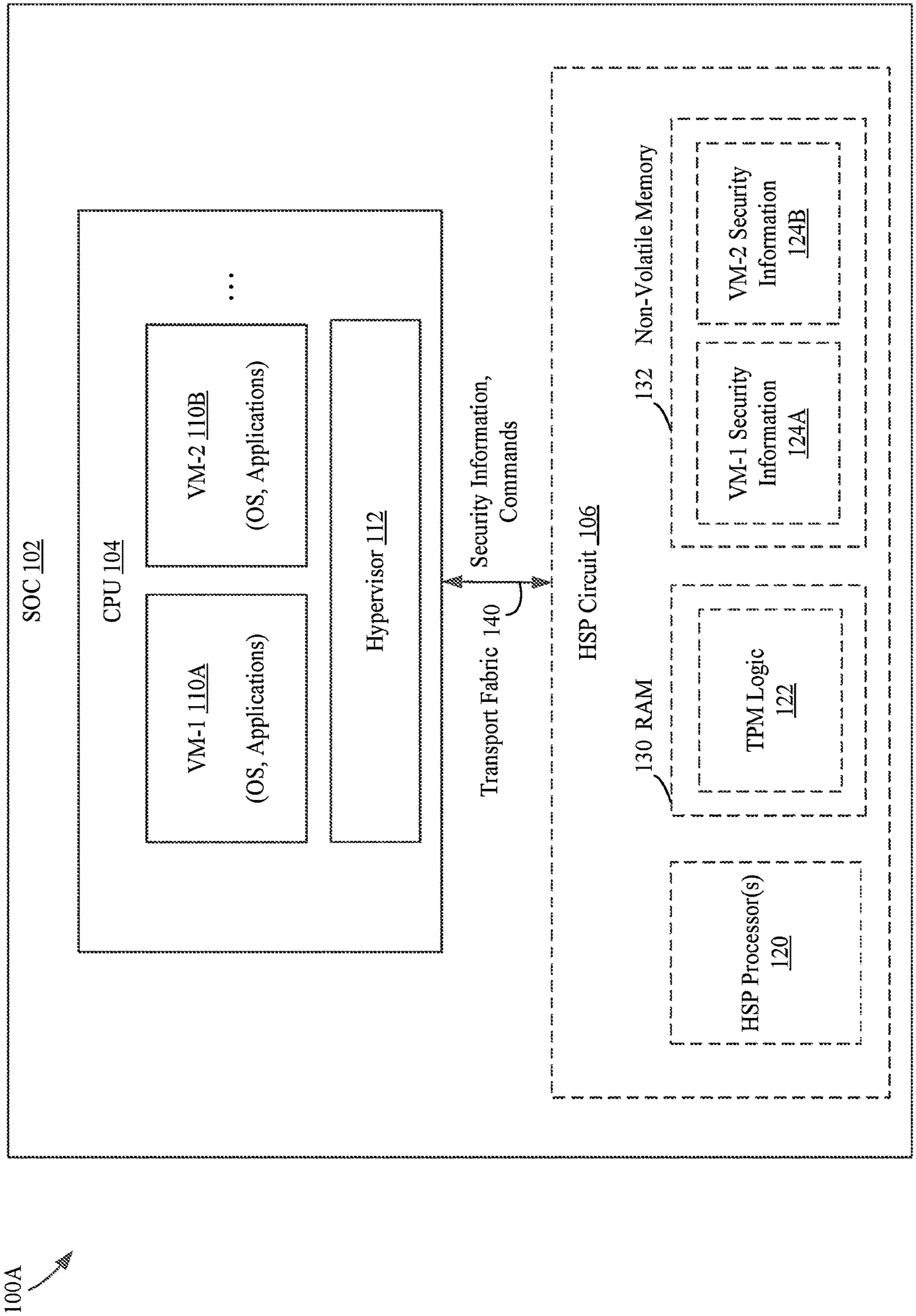
FIG. 1A shows a block diagram of a system for implementing a virtualized trusted platform module (TPM) where TPM functionality is performed in hardware security platform (HSP) circuitry, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As described above, VMs may be deployed in any suitable a host machine, for example, a CPU core of a cloud computing platform. A hypervisor in the host machine may initialize and manage one or more VMs and the VMs may utilize a TPM for security measures (e.g., to provide attestation and data protection support). Embodiments disclosed herein may comprise virtual TPMs exposed by a hypervisor to VMs in the host machine. TPM functionality may be implemented in a hardware security platform (HSP) that is communicatively coupled to the hypervisor via a transport fabric (e.g., a network on a chip). Security information related to the TPM, such as encryption keys, instantiation measurements, and authorization data, may be stored in nonvolatile memory of the HSP. In this manner, security information is better protected as compared to systems that store TPM data in the hypervisor. For example, some VMs in today's cloud computing systems utilize virtual TPMs (VTPMs) to provide enhanced attestation and data protection support. Existing VTPMs may store security information in the hypervisor on the host machine. In this scenario, the hypervisor comprises the security boundary for the VMs and protection provided by the VTPM is only as secure as the hypervisor itself. If the hypervisor is compromised, any VTPM data stored in the hypervisor could potentially be exposed. The present HSP based solution provides hardware-backed storage for TPM security information such as encryption keys and secure measurements of the hypervisor and VM binary files. Moreover, the HSP firmware may be measured and the measurements may be included in the TPM security information which does not happen in current VTPMs for VMs today.

In some embodiments, HSP firmware may be configured to implement TPM functionality with a mechanism to distinguish and isolate TPMs or TPM security information for different VMs. HSP firmware may be configured to keep separate, security information such as keys and measurements associated with each VM initialized by a hypervisor. The TPM data for each VM may be encrypted, and access to the decrypted data may be provided only to the appropriate VM based on authorization data provided by the VM.

Hypervisor interfaces may be implemented for VMs to communicate with and use HSP hardware and TPM functionality implemented on the HSP hardware. For example, a hypervisor may expose HSP hardware and TPM functionality to a VM. The hypervisor may initialize TPM data for a VM when it launches the VM. TPM commands issued by a VM may go through hypervisor interfaces to the HSP, and the hypervisor may provide authorization values associated with the VM requesting the operations to the TPM.

Users may create VM images and provision the TPM. During image creation users may also setup authorization data (e.g., PINs). Users may use existing TPM APIs and technologies to use TPM capabilities provided by the HSP.

Embodiments for virtualizing a TPM on an HSP for virtual machines (VMs) may be implemented and may operate in various ways. Such embodiments are described as follows. For instance, FIG. 1A shows a block diagram of a system 100A for implementing a virtualized TPM where TPM functionality is performed in HSP circuitry, according to an example embodiment. As shown in FIG. 1A, system 100A includes a system on a chip (SOC) 102, a central processing unit (CPU) 104, and a HSP circuit 106. CPU 104 comprises a virtual machine-1 (VM-1) 110A, a VM-2 110B and a hypervisor 112. HSP circuit 106 comprises a HSP processor 120, a random-access memory (RAM) 130, and a non-volatile memory (NVM) 132. RAM 130 stores TPM logic 122. NVM 132 stores VM-1 security data 124A and VM-2 security data 124B. Also shown in system 100A is transport fabric 140. These features of system 100A are described in further detail as follows.

SOC 102 may comprise an integrated circuit including, among other things, CPU 104, HSP circuit 106, and transport fabric 140. Transport fabric 140 may comprise a network on a chip and CPU 104 and HSP circuit 106 may communicate via transport fabric 140. In some embodiments, SOC 102 may comprise additional CPU cores that communicate via transport fabric 140. HSP circuit 106 may be considered another core on SOC 102, which may be a smaller processing unit dedicated to a special purpose (e.g., hardware security processor and TPM) rather than a general purpose processor. Although system 100A is shown as having an SOC and a CPU communicatively coupled with HSP circuit 106, the disclosure is not limited in this regard, and any suitable system may be utilized, such as a motherboard with one or more integrated circuit processors and/or discrete components that perform the functionality described below with respect to CPU 102, HSP circuit 106, and transport fabric 140. In one embodiment, HSP circuit 106 may comprise a discrete chip.

SOC 102 may be implemented in any type of mobile computing device, such as a Microsoft® Surface® device, a personal digital assistant (PDA), a laptop computer, a notebook computer, a tablet computer such as an Apple iPad™, a cloud computing server, a netbook, a smart phone (such as an Apple iPhone, a phone implementing the Google® Android™ operating system), a wearable computing device (e.g., a head-mounted device including smart glasses such as Google® Glass™, a virtual headset such as Oculus Rift® by Oculus VR, LLC or HoloLens® by Microsoft Corporation), a stationary computing device such as a desktop computer or PC (personal computer), or other browser-enabled device.

CPU 104 comprises any number of processors, such as one or more central processing units (CPUs), microprocessors, multi-processors, processing cores, and/or any other hardware-based processors described herein or otherwise known. Hypervisor 112 may comprise software, firmware, and/or hardware configured to create and manage one or more virtual machines such as VM-1 110A and VM-2 110B, and/or additional VMs. VM-1 110A and VM-2 110B may comprise a virtualization or emulation of a computing system. In some embodiments VM-1 110A and/or VM-2 110B may comprise, among other things, an operating system (OS) and one or more applications.

In some embodiment, HSP circuit 106 may comprise a microcontroller and/or one or more processors. For example, HSP 106 may comprise, among other things, HSP processor 120, RAM 130, NVM 132, a read only memory (ROM) (see ROM 330 in FIG. 3) and/or other types of storage devices. TPM logic 122 may be stored in RAM 130 and/or may be implemented in software, firmware, and/or hardware of HSP circuit 106. HSP circuit 106 may be configured to perform the functions described below with respect to TPM logic 122. HSP circuit 106 may be configured to protect and manage security information such as encryption keys, executable code measurements, and authorization data that may be stored in NVM 132. HSP processor(s) 120 may comprise one or more processors configured to perform TPM and/or cryptographic operations, such as encryption and/or decryption functions, digital signatures, authentication, and/or attestation. In some embodiments, VM-1 security information 124A and/or VM-2 security information 124B stored in NVM 132 may be encrypted.

Figure 1B:
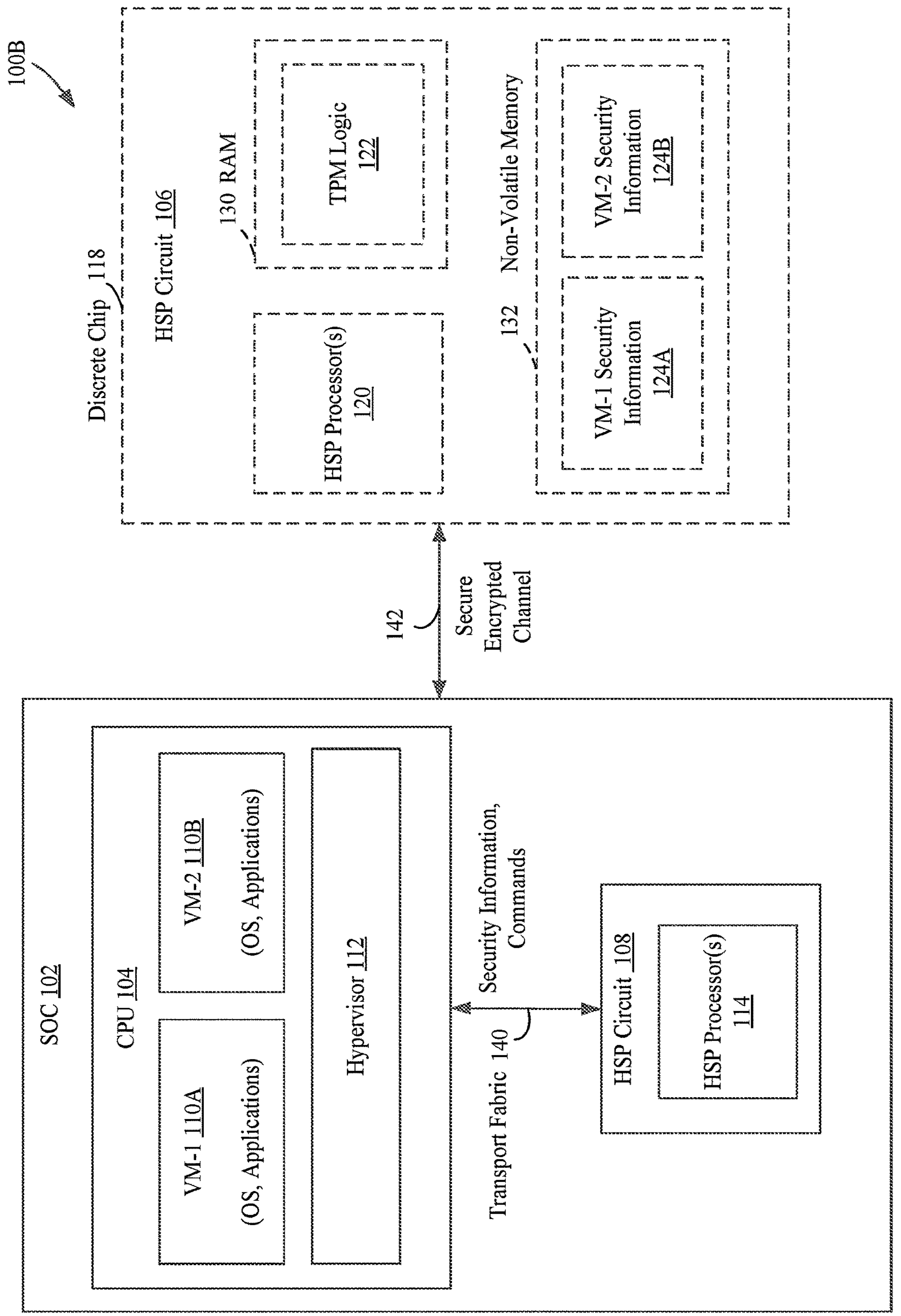
FIG. 1B shows a block diagram of a system for implementing a virtualized TPM where TPM functionality is performed in HSP circuitry on a discrete chip, according to an example embodiment.

HSP circuit 106 may be configured in various ways to perform these and further functions. For instance, FIG. 1B shows a block diagram of a system 100B for implementing a TPM where TPM functionality is performed in HSP circuitry on a discrete chip, according to an example embodiment. As shown in FIG. 1B, system 100B includes SOC 102, CPU 104, HSP circuit 108, and discrete chip 118. CPU 104 comprises VM-1 110A, VM-2 110B, and hypervisor 112. Discrete chip 118 comprises HSP circuit 106, HSP processor 120, RAM 130, and NVM 132. RAM 130 stores TPM logic 122. NVM 132 stores VM-1 security data 124A and VM-2 security data 124B. Also shown in system 100B is transport fabric 140 and a secure encrypted channel 142. These features of system 100B are described in further detail as follows.

In some embodiments, HSP circuit 106 may be implemented on a discrete chip. For example, SOC 102 and discrete chip 118 may comprise separate chips on a motherboard that are communicatively coupled by secure encrypted channel 142. Communication between CPU 104 and HSP circuit 106 may be managed by HSP processor 114 of HSP circuit 108 and HSP processor 120 of discrete chip 118. HSP processor 114 and/or HSP processor 120 may be configured to manage encryption keys utilized for communication between SOC 102 and discrete chip 118. VM-1 110A, VM-2 110B may communicate with HSP circuit 106 (e.g., TPM logic 122 and/or HSP processor 120) via hypervisor 112, transport fabric 140 and HSP circuit 108. HSP processor 114 may forward communications between CPU 104 and discrete chip 118 utilizing secure encrypted channel 142. Although embodiments described herein as being implemented in system 100A, the embodiments may also be implemented with system 100B utilizing HSP circuit 108 and HSP processor 114 to forward and/or receive communications between HSP circuit 106 on discrete chip 118.

Figure 2:
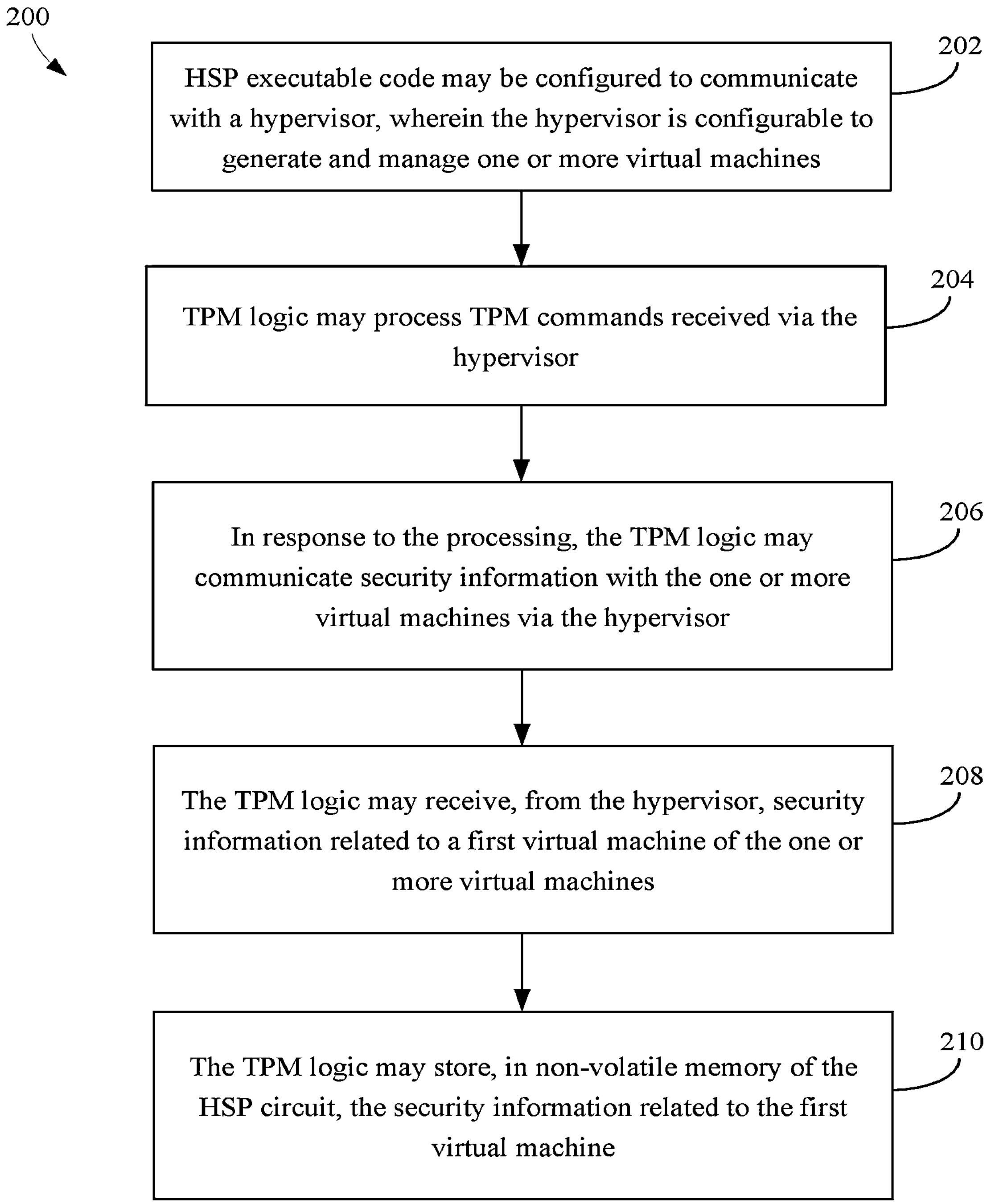
FIG. 2 shows a flowchart of a method in an HSP to store security information related to a virtual machine in the HSP, according to an example embodiment.

HSP circuit 106 may be configured in various ways, and may operate in various ways, to perform these and further functions. For instance, FIG. 2 shows a flowchart 200 of a method in an HSP to store security information related to a virtual machine in the HSP, according to an example embodiment. Flowchart 200 may be implemented HSP circuit 106. For purposes of illustration, flowchart 200 is described with reference to FIGS. 1 and 3-6.

Figure 3:
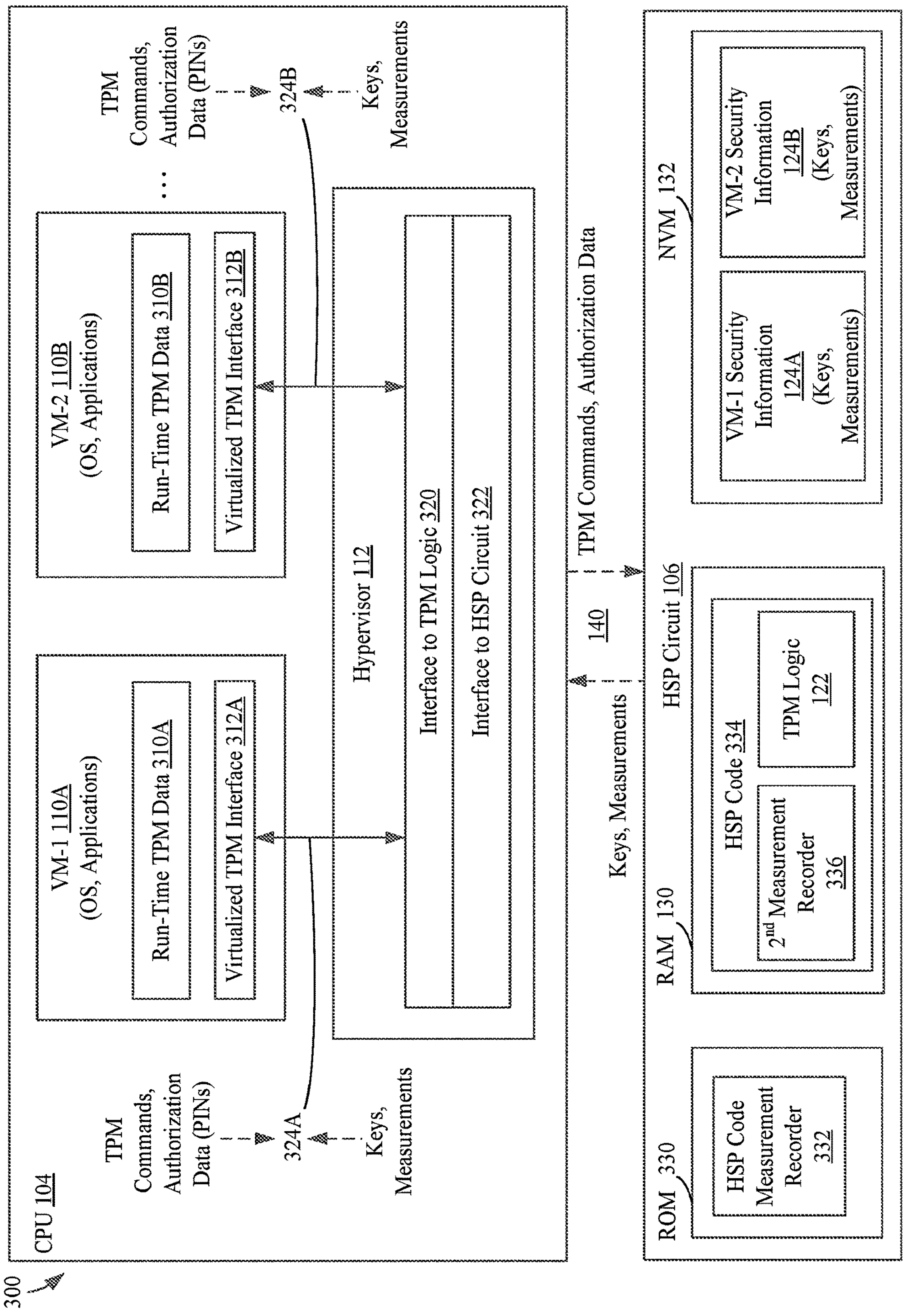
FIG. 3 shows a block diagram of a system for virtualizing TPM functions performed on an HSP for one or more VMs, according to an example embodiment.

FIG. 3 shows a block diagram of a system 300 for virtualizing a TPM functions performed on an HSP for one or more VMs, according to an example embodiment. As shown in FIG. 3, system 300 comprises CPU 104, HSP circuit 106, and transport fabric 140. CPU 104 includes VM-1 110A, VM-2 110B, hypervisor 112, VM-1 communications 324A, and VM-2 communications 324B. VM-1 110A includes run-time TPM data 310A and a virtualized TPM interface 312A. VM-2 110B includes run-time TPM data 310B and a virtualized TPM interface 312B. Hypervisor 112 comprises an interface to TPM logic 320 and an interface to HSP circuitry 322. HSP circuit 106 comprises a read only memory (ROM) 330, RAM 130, and NVM 132. ROM 330 stores an HSP code measurement recorder 332. RAM 130 stores HSP executable code 334 and TPM logic 122. HSP executable code 334 comprises a second measurement recorder 336. NVM 132 stores VM-1 security information 124A and VM-2 security information 124B.

Figure 4:
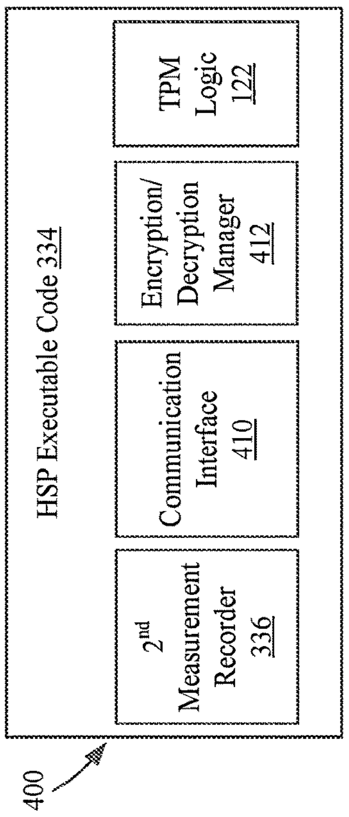
FIG. 4 shows a block diagram of a system comprising HSP executable code, according to an example embodiment.

FIG. 4 shows a block diagram of a system 400 comprising HSP executable code, according to an example embodiment. As shown in FIG. 4, system 400 comprises HSP executable code 334, second measurement recorder 336, communication interface 410, and encryption and/or decryption manager 412.

Figure 5:
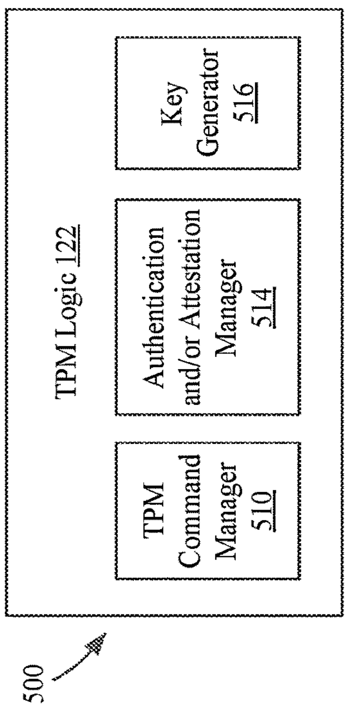
FIG. 5 shows a block diagram of a system comprising TPM logic, according to an example embodiment.

FIG. 5 shows a block diagram of a system 500 comprising TPM logic, according to an example embodiment. As shown in FIG. 5, system 500 comprises a TPM command manager 510, an authentication and/or attestation manager 514, and a key generator 516.

Figure 6:
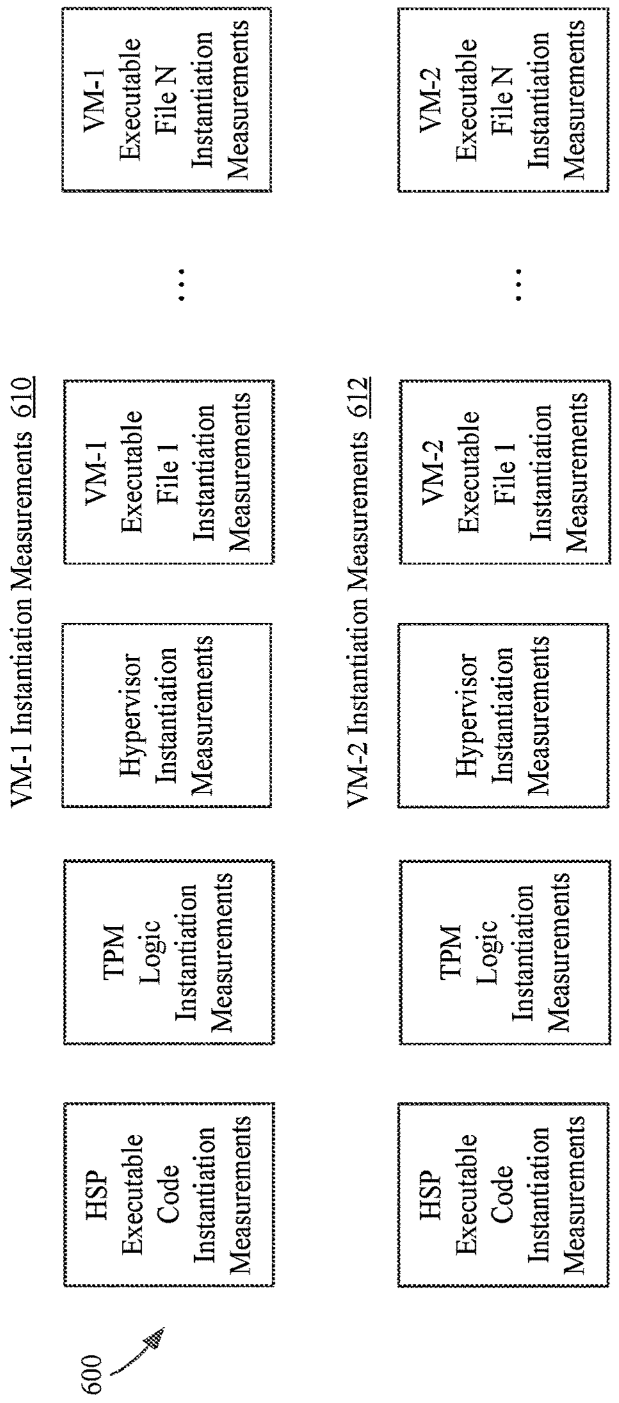
FIG. 6 shows a block diagram of a system illustrating types of instantiation measurements that may be stored in the HSP for each virtual machine, according to an example embodiment.

FIG. 6 shows a block diagram of a system 600 illustrating types of instantiation measurements that may be stored in the HSP for each virtual machine, according to an example embodiment. As shown in FIG. 6, system 600 comprises VM-1 instantiation measurements 610 and VM-2 instantiation measurements 612.

Other structural and operational embodiments will be apparent to persons skilled in the relevant art(s) based on the following discussion regarding flowchart 200 and FIGS. 3 and 4-6.

Flowchart 200 of FIG. 2 begins with step 202. In step 202, HSP executable code is configured to communicate with a hypervisor. The hypervisor is configurable to generate and manage one or more virtual machines. For example, CPU 104 may comprise hypervisor 112 that may comprise software and/or hardware configured to create one or more virtual machines. For example, hypervisor 112 may create VM-1 110A and/or VM-2 110B in response to a request. Hypervisor 112 may keep track of how many VMs are running in CPU 104 and allocate resources across them. Each VM may comprise a guest operating system.

In some embodiments, hypervisor 112 may be configured to present a virtual operating platform comprising TPM logic 122 to the guest operating systems of each of VM-1 110A and VM-2 110B. Interfaces in VM-1 110A and VM-2 110B are configured to allow the VMs to communicate with TPM logic 122 via the underlying hypervisor layer. Each VM, such as VM-1 110A and VM-2 110B, may comprise a virtualized TPM interface (e.g., virtualized TPM interface 312A and virtualized TPM interface 312B respectively). Hypervisor 112 may comprise interface to TPM logic 320 which may be communicatively coupled to virtualized TPM interface 312A and virtualized TPM interface 312B. Hypervisor 112 may also comprise interface to HSP circuit 322 that may be configured to communicate with interface 410 in HSP executable code 334 (see FIG. 4) via transport fabric 140. VM-1 110A may be configured to send TPM commands to TPM logic 122 via hypervisor 112 utilizing virtualized TPM interface 312A and may receive security information from TPM logic 122 via hypervisor 112 utilizing virtualized TPM interface 312A. In a similar manner, VM-2 110B may be configured to send TPM commands to TPM logic 122 via hypervisor 112 utilizing virtualized TPM interface 312B and may receive security information from TPM logic 122 via hypervisor 112 utilizing virtualized TPM interface 312B. At the high-level layer of the VMs, it may appear to the VMs that they communicate directly with TPM logic 122. TPM logic 122 is exposed to interface to HSP circuit 322 of hypervisor 112 by communication interface 410 of HSP executable code 334 in HSP circuit HSP 106, via transport fabric 140.

As described above, virtualized TPM interfaces 312A and 312B may allow VM-1 110A and VM-2 110B to communicate with TPM logic 122 via hypervisor 112. For example, VM-1 110A may be configured to send a TPM command to TPM logic 122 by sending the command to virtualized TPM interface 312A, which may be configured to present the TPM command to interface to TPM logic 320 in hypervisor 112. Interface to HSP circuit 322 in hypervisor 320 may communicate the TPM command to interface to HSP circuit 322 in HSP circuit 106 via transport fabric 140. Communication interface 410 of HSP executable code 334 may present the command to TPM logic 122.

In step 204, the TPM logic may process TPM commands received via the hypervisor. For example, TPM logic 122 may be configured to perform various security functions such as cryptographic operations for VM-1 110A and VM-2 110B in response to commands received from VM-1 110A and VM-2 110B. In some embodiments TPM logic 122 may be configured to perform its functions in accordance with the ISO/IEC 11889 specification to enable trust in virtual machines running on CPU 104 such as VM-1 110A and VM-2 110B, and hypervisor 112. For example, TPM logic 122 may be configured to perform encryption and/or decryption functions, digital signatures, authentication, and/or attestation in response to TPM commands received via hypervisor 112 from VM-1 110A or VM-1 110B.

In one embodiment, VM-1 instantiation measurements 610 (e.g., boot sequences) for components (e.g., firmware) of HSP executable code 334, TPM logic 122, hypervisor 112, and/or VM-1 110A may be stored as VM-1 security information 124A in NVM 132 of HSP circuit 106. Before allowing executable code (e.g., an operating system or application) in VM-1 110A to execute, VM-1 110A may be configured to determine whether the configuration state (boot sequences) of the instantiated executable code (e.g., firmware) is correct as expected. In this regard, VM-1 110A may be configured to determine whether any unauthorized firmware updates or modifications are running, or whether an authorized update occurred in any of VM-1 110A, hypervisor 112, HSP executable code 334, and/or TPM logic 122. VM1-110A may send a TPM command to TPM logic 122 to request attestation processing. During attestation, TPM logic 122 may be configured to respond to the TPM command by retrieving instantiation measurements stored as VM-1 security information 124A in NVM 132.

In step 206, in response to the processing, the TPM logic may communicate security information with the one or more virtual machines via the hypervisor. For example, TPM logic 122 may be configured to process commands received from VM-1 110A and VM-2 110B, and depending on the content of a command, may respond to the commands by sending security information to VM-1 110A and VM-2 110B respectively via the above described interfaces in a reverse path via hypervisor 112.

Further to the embodiment described with respect to step 204, in response to processing the TPM command, TPM logic 122 may be configured to send the instantiation measurements stored as VM-1 security information 124A in NVM 132 to VM-1 110A via hypervisor 112. If the instantiation measurements indicate that correct components of VM-1 110A, hypervisor 112, HSP executable code 334 and/or TPM logic 122 were instantiated in the correct order (e.g., thereby generating the expected configuration state), the executable code (e.g., the operating system or application) of VM-1 110A may be allowed to execute, otherwise, if the instantiation measurements indicate a different order or different components than expected, the executable code may not be allowed to run.

In step 208, the TPM logic may receive security information related to a first virtual machine of the one or more virtual machines from the hypervisor. In this regard, TPM logic 122 may be configured to receive various types of security information related to VM-1 110A, VM-2 110B from hypervisor 112. For example, VM-1 110A and VM-2 110B may be configured to send security information comprising authorization data (e.g., PIN values), encryption keys, instantiation measurements, and/or other security information in VM-1 communications 324A and VM-2 communications 324B respectively, to TPM logic 122 via hypervisor 112. For example, VM-1 110A and VM-2 110B may each send their security information to virtualized TPM interface 312A and virtualized TPM interface 312B respectively. Virtualized TPM interface 312A and virtualized TPM interface 312B may be configured to expose their respective security information to TPM logic 320. Interface to HSP circuit 322 may be configured to transmit the security information from VM-1 110A and VM-2 110B via transport fabric 140 to communication interface 410 of HSP circuit 106. TPM logic 122 may receive the security information from VM-1 110A and VM-2 110B via communication interface 410.

In some embodiments, hypervisor 112 may provide security information for VM-1 110A and/or VM-2 110B to TPM logic 122. For example, hypervisor 112 may be configured to initialize VM-1 security information 124A when it launches VM-1 110A and may initialize VM-1 security information 124B for VM-2 110B when it launches VM-2 110B. In one embodiment, a user (e.g., an administrator) may create VM images for VM-1 110A and VM-2 110B including provisioning of TPM logic 122 for the VMs (e.g., configuring security features of TPM logic 122 for use cases supported by hypervisor 112, VM-1 110A, and VM-2 110B). During image creation the user may also setup respective security information such as authorization data (e.g., PIN values, keys, etc.) for each of VM-1 110A and VM-2 110B, for utilization of the VMs. Users may be able to use existing TPM APIs and technologies to use TPM logic 122 capabilities provided by HSP executable code 334. Hypervisor 112 may be configured to communicate the security information to TPM logic 122 via transport fabric 140.

In step 210, the TPM logic may store the security information related to the first virtual machine in non-volatile memory of the HSP circuit. For example, TPM logic 122 may be configured to receive security information related to VM-1 110A from VM-1 110A (e.g., security information of VM-1 communications 324A) and/or from hypervisor 112, and may store the security information related to VM-1 110A as VM-1 security information 124A in NVM 132 of HSP circuit 106. Moreover, TPM logic 122 may be configured to receive security information related to VM-2 110B from VM-2 110B (e.g., security information of VM-2 communications 324B) and/or from hypervisor 112, and may store the security information related to VM-2 110B as VM-2 security information 124B in NVM 132 of HSP circuit 106. Security information related VM-1 110A may be stored separate from and/or may be distinguishable from security information related to VM-2 110B. The security information may comprise among other things authorization data (e.g., PIN values), encryption keys, and instantiation measurements. In some embodiments, encryption and/or decryption manager 412 may be configured to encrypt the security information related to VM-1 110A and security information related to VM-2 110B such that VM-1 security information 124A and VM-2 security information 124B stored in NVM 132 of HSP circuit 106 may be encrypted. In this regard, encryption and/or decryption manager 412 may be configured to decrypt VM-1 security information 124A or VM-2 security information 124B in response to receiving a request for security information along with corresponding correct authorization data (e.g., a PIN) from VM-1 110A or VM-2 110B respectively. Encryption and/or decryption manager 412 may be configured to compare the received authorization data with corresponding authorization data stored with VM-1 security information 124A or VM-2 security information 124B respectively.

In some embodiments, the security information stored in NVM 132 of HSP circuit 106 (e.g., VM-1 security information 124A and/or VM-2 security information 124B) may include measurements from various boot logs (e.g., from TCG logs) that may identify which executable files or components were loaded and/or instantiated when booting or configuring a corresponding device (e.g., firmware) or a virtual machine. In general, the measurements may indicate how a system is instantiated. For example, a system may be instantiated by the execution of a chain of different executable components. The identity of each of those components and the order in which they are initialized may be measured and stored in HSP circuit 106 to provide improved security. Although, additional measurements may be stored in HSP circuit 106 (e.g., at run time, an application may request measurements to be stored), often what is measured are executable files or components that are instantiated or configured up until the OS kernel is running. In this regard, VM-1 instantiation measurements 610 (see FIG. 6) may comprise measurements for executable components (e.g., firmware) of one or more of HSP executable code 334, TPM logic 122, hypervisor 112, or VM-1 110A that may be stored as VM-1 security information 124A in NVM 132 of HSP circuit 106. VM-2 instantiation measurements 612 may comprise measurements for executable components of one or more of HSP executable code 334, TPM logic 122, hypervisor 112, or VM-2 110B that may be stored as VM-2 security information 124B in NVM 132 of HSP circuit 106.

In some embodiments, measurements may be recorded based on the instantiation of HSP executable code 334, TPM logic 122, hypervisor 112, VM-1 110A, VM-2 110B, and other VMs associated with HSP circuit 106. The instantiation measurements may include identities of loaded and/or instantiated executable files or executable components and the order in which they were loaded and/or instantiated. The instantiation measurements may help detect problems (e.g., a malicious scenario) that may have occurred during a boot process and whether an expected boot sequence was properly followed. For example, TPM logic 122 of HSP circuit 106 may be configured to perform attestation based on instantiation measurements for VM-1 110A or VM-2 110B before allowing an OS or application software to run in the respective VM. In general, attestation is a process where proof of a device or VM's configuration state is determined using its instantiation measurements. The measurements may be recorded as the device or VM's executable files (e.g., firmware) are instantiated. For example, a firmware or software layer running in a booting sequence of a device may measure the instantiation and/or configuration of firmware/software components in a layer above it, and may extend a current measurement value stored in a designated platform configuration register (PCR) with a new measurement value. For example, a basic input/output system (BIOS) may measure various components of a bootloader and these values may be stored in a PCR as a hash value. A current measurement value in a PCRn register may be extended with a new measurement where a hashing algorithm may be applied to the union of the new measurement and the current PCRn hash value and the resultant hash value (hash-chained measurement) is stored in a PCRn+1 as a measurement extension. The PCR registers may be implemented in volatile or non-volatile memory (e.g., NVM 132 or RAM 130).

Although communication between the virtual machines in CPU 104 (e.g. VM-1 110A and VM-2 110B) and HSP circuit 106 is described herein as occurring via hypervisor 112, in some embodiments, hypervisor 112 may be treated as an untrusted element of the system and may not be utilized for such communication. For example, In order to provide more secure communications, a confidential channel that may be inaccessible to hypervisor 112, may be configured between the virtual machines and HSP circuit 106. When VM-1 110A communicates with TPM logic 122 (e.g., to send or receive TPM commands and/or security information), CPU microcode and/or hardware of CPU 104, such as command-response buffers (not shown), may facilitate communications between virtualized TPM interface 312A and transport fabric 140 to allow VM-1 110A to communicate with HSP circuit 116 and TPM logic 122 without involving hypervisor 112.

Hypervisor 112 and HSP circuit 106 may be configured in various ways, and may operate in various ways, to perform these and further functions. For instance, FIG. 7 shows a flowchart 700 of a method for storing instantiation measurements related to a virtual machine in persistent memory of an HSP circuit, according to an example embodiment. Flowchart 700 may be implemented in HSP circuit 106. For purposes of illustration, flowchart 700 is described with reference to FIGS. 1 and 3-6. Other structural and operational embodiments will be apparent to persons skilled in the relevant art(s) based on the following discussion regarding flowchart 700 and FIGS. 1 and 3-6.

Flowchart 700 of FIG. 7 begins with step 702. In step 702, the TPM logic may receive, from the hypervisor, a sequence of instantiation measurements related to the first virtual machine of the one or more virtual machines. For example, hypervisor 112 may be configured to instantiate VM-1 110A and take instantiation measurements comprising identification of a plurality of instantiated executable components of VM-1 110A and the sequence in which the executable components are instantiated. For example, for a VM (e.g., VM-1 110A or VM-2 110B) that runs a Windows® operating system, the executable components may comprise unified extensible firmware interface (UEFI) firmware, an OS boot loader such as Windows® Boot Manager, and then an OS loader or an OS kernel. For a VM (e.g., VM-1 110A or VM-2 110B) running a Linux operating system, the executable components may comprise UEFI or grand unified boot loader (GRUB) firmware, a form of an OS loader, and then the Linux kernel. Hypervisor 112 may be configured to transmit the VM-1 110A instantiation measurements to HSP circuit 106 via the interface to HSP circuit 322 and transport fabric 140. TPM logic 122 in HSP circuit 106 may receive the VM-1 110A measurements via communication interface 410.

Moreover, hypervisor 112 may be configured to instantiate VM-2 110B and take instantiation measurements comprising identification of a plurality of executable components of VM-2 110B and the sequence in which the executable components are instantiated. Hypervisor 112 may be configured to transmit the VM-2 110B instantiation measurements to HSP circuit 106 via interface to HSP circuit 322 and transport fabric 140. TPM logic 122 in HSP circuit 106 may receive the VM-2 110B measurements via communication interface 410.

In step 704, the TPM logic may store, in non-volatile memory of the HSP circuit, each measurement of the sequence of instantiation measurements related to the first virtual machine as a measurement extension relative to a prior measurement of the sequence. For example, TPM logic 122 may store VM-1 110A instantiation measurements in NVM 132 as VM-1 security information 124A. As described above (and further below), in some embodiments, each successive VM-1 110A instantiation measurement received from hypervisor 112 may be stored as an extension of prior VM-1 110A instantiation measurements, for example, in PCR registers (not shown). In some embodiments, encryption and/or decryption manager 412 may be configured to encrypt the VM-1 110A instantiation measurements such that VM-1 security information 124A may be encrypted. Alternatively, or in addition, hypervisor 112 may be configured to encrypt the VM-1 110A instantiation measurements prior to transmitting the measurements to HSP circuit 106.

Moreover, TPM logic 122 may store VM-12 110B instantiation measurements in NVM 132 as VM-2 security information 124B. Each successive VM-2 110B instantiation measurement received from hypervisor 112 may be stored as an extension of prior VM-2 110B instantiation measurements. In some embodiments, encryption and/or decryption manager 412 may be configured to encrypt the VM-2 110B instantiation measurements such that VM-2 security information 124B may be encrypted. Alternatively, or in addition, hypervisor 112 may be configured to encrypt the VM-1 110B instantiation measurements prior to transmitting the measurements to HSP circuit 106.

In some embodiments, hypervisor 112 may transmit authorization data (e.g., a PIN) that is associated with VM-1 110A or VM-2 110B instantiation measurements (or with other types of security information such as an encryption key) to HSP circuit 106 that may be stored in VM-1 security information 124A or VM-2 security information 124B respectively. When VM-1 110A or VM-2 110B requests their respective instantiation measurements (or other respective security information such as an encryption key stored in NVM 132), hypervisor 112 may be configured to transmit the associated authorization data to TPM logic 122 via transport layer 140 in order for TPM logic 122 to release and transmit the requested respective instantiation measurements (or other respective security information) back to the requesting VM (e.g., VM-1 110A or VM2-110B).

VM-1 security information 124A in HSP circuit 106 may comprise instantiation measurements for VM-1 110A. TPM logic 122 in HSP circuit 106 may be configured to receive a sequence of instantiation measurements related to VM1-110A from hypervisor 112 and may store the measurements in non-volatile memory 132 of HSP circuit 106 For example, each subsequent received measurement of the sequence of instantiation measurements may be stored as a measurement extension relative to prior measurements of the sequence.

In some embodiments, only the measurements of virtual machine executable files may be included in VM-1 security information 124A and VM2 security information 124B. In other embodiments measurements for one or more of HSP executable code 334, TPM logic 122, and hypervisor 112 may also be stored with measurements of VM-1 110A in VM-1 security information 124A, or with measurements of VM-2 110B in VM-2 security information 124B.

Figure 8:
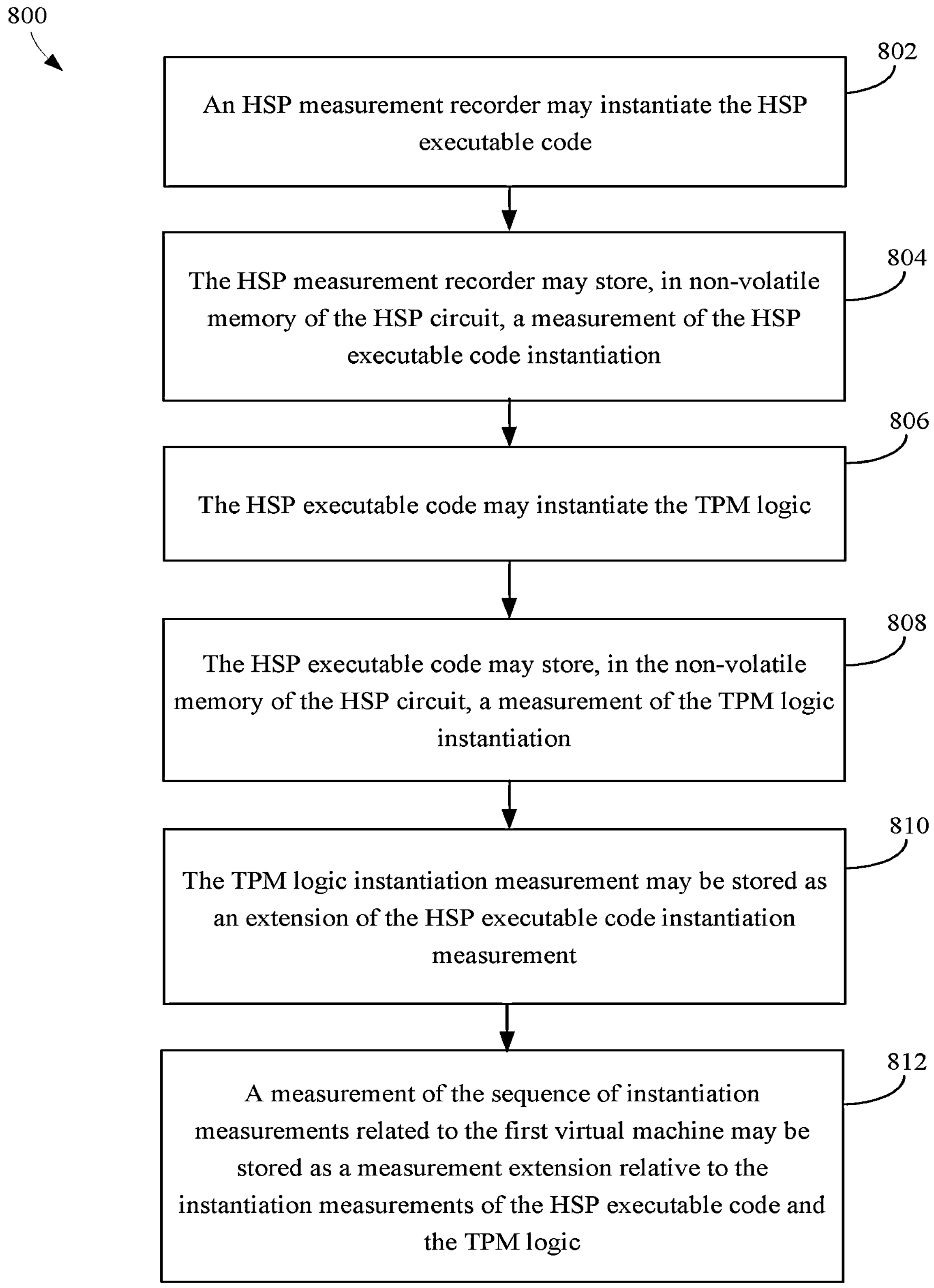
FIG. 8 shows a flowchart of a method in an HSP to store instantiation measurements related to a virtual machine with one or more of hypervisor measurements, HSP executable code measurements, and TPM logic measurements, according to an example embodiment.

Hypervisor 112 and HSP circuit 106 may be configured in various ways, and may operate in various ways, to perform these and further functions. For instance, FIG. 8 shows a flowchart 800 of a method in an HSP to store instantiation measurements related to a virtual machine with one or more of hypervisor measurements, HSP executable code measurements, and TPM logic measurements, according to an example embodiment. Flowchart 800 may be implemented in HSP circuit 106. For purposes of illustration, flowchart 800 is described with reference to FIGS. 1 and 3-6. Other structural and operational embodiments will be apparent to persons skilled in the relevant art(s) based on the following discussion regarding flowchart 800 and FIGS. 1 and 3-6.

Flowchart 800 of FIG. 8 begins with step 802. In step 802, an HSP measurement recorder may instantiate the HSP executable code. For example, HSP code measurement recorder 332, which may comprise immutable code stored in ROM 330, may be configured to load and instantiate HSP executable code 334 in HSP circuit 106 for processing by HSP processor 120. In some embodiments, HSP executable code 334 may be instantiated prior to TPM logic 122, TPM logic 122 may be instantiated prior to hypervisor 112, and VM-1 110A and VM-2 110B may be subsequently instantiated by hypervisor 112.

In step 804, the HSP measurement recorder may store, in the non-volatile memory of the HSP circuit, a measurement of the HSP executable code instantiation. In some embodiments, measurement of the instantiation of HSP executable code 334 may be stored in one or more PCR registers (e.g., in RAM 130 or NVM 132). For example, HSP code measurement recorder 332, which may comprise immutable code stored in ROM 330, may be configured to hash a HSP executable code 334 instantiation measurement (e.g., utilizing a hash algorithm such as Secure Hash Algorithm (SHA)-1, SHA256, SHA348, SHA512, Advanced Encryption Standard (AES)-128, Rivest-Shamir-Adleman Cryptosystem (RSA)-2048, Elliptic Curve Cryptography (ECC)-P256), and store the resulting hash value in $PCR_0$.

In step 806, the HSP executable code may instantiate the TPM logic. For example, second measurement recorder 336 may be configured to load and instantiate one or more components of TPM logic 122 for processing by HSP processor 120.

In step 808, the HSP executable code may store, in the non-volatile memory of the HSP circuit, a measurement of the TPM logic instantiation. For example, second measurement recorder 336 may be configured to store the TPM measurement in memory on HSP circuit 106 (e.g., in RAM 130 or NVM 132).

In step 810, the TPM logic instantiation measurement may be stored as an extension of the HSP executable code instantiation measurement. For example, second measurement recorder 336 may be configured to sum the TPM measurements with the HSP executable code hash value of $PCR_0$, apply the hash algorithm to the sum, and store the resulting hash value in $PCR_1$ as a measurement extension of the hash value stored in $PCR_0$.

In step 812, a measurement of the sequence of instantiation measurements related to the first virtual machine may be stored as a measurement extension relative to the instantiation measurements of the HSP executable code and the TPM logic. For example, the security information related to the first virtual machine received from hypervisor 112 may comprise a measurement of the sequence of instantiation measurements related to VM-1 110A. TPM logic 122 may be configured to sum the hash value stored in $PCR_1$ (e.g., comprising the HSP executable code 334 measurements and the TPM logic 122 measurements) and apply the hash algorithm to the sum. The resulting hash value may be stored in $PCR_2$ as a measurement extension of the hash value stored in $PCR_1$.

In some embodiments, measurements for hypervisor 112 firmware may also be included in the measurements for VM-1 110A and/or VM-1 110B. For example, Hypervisor 112 may be instantiated prior to VM-1 110A and VM2-110B. TPM logic 122 may be configured to sum the hash value stored in $PCR_1$ (e.g., comprising the HSP executable code 334 measurements and the TPM logic 122 measurements) with instantiation measurements of hypervisor 112 (e.g., received from hypervisor 112), and apply the hash algorithm to this sum The resulting hash value may be stored in $PCR_2$ as a measurement extension of the hash value stored in $PCR_1$. TPM logic 122 may further be configured to sum the hash value stored in $PCR_2$ (e.g., comprising the HSP executable code 334 measurements, the TPM logic 122 measurements, and the hypervisor measurements) with the instantiation measurements of one or more executable files of VM-1 110A (e.g., an operating system), and apply the hash algorithm to this sum. The resulting hash value may be stored in $PCR_3$ as a measurement extension of the hash value stored in $PCR_2$. This process of storing measurement extensions in successive PCR registers may be continued for additional files or firmware/software components of VM-1 110A (e.g., through VM-1 executable file N of VM-1 instantiation measurement 610, of FIG. 6). These hash values stored in successive PCR registers may comprise VM-1 security information 124A, where each successive PCR hash value may be referred to as an extension of the prior PCR hash value. The instantiation measurements for VM-1 110A stored in HSP circuit 106 may include measurements for HSP executable code 334, TPM logic 122, hypervisor 112, and one or more files or components of VM-1 110A (e.g., through an OS kernel for VM-1 110A). In this manner, TPM logic 122 may be configured to provide attestation for VM-1 110A OS or applications based on the firmware configurations of HSP code 334 through VM-1 110A (e.g., HSP executable code 334, TPM logic 122, hypervisor 112, and VM1-110A). The same processes described above with respect to VM-1 110A (e.g., corresponding to flowcharts 200, 700, and 800) may be performed for VM-2 110B using instantiation measurements of VM-2 110B instead of instantiation measurements of VM-1 110A, where VM-2 security information 124B may comprise hash values stored in successive PCR registers for VM-2 110B, and may be stored separately from and/or distinguishable from VM-1 110A measurements of VM-1 security information 124A.

TPM logic 122 may be configured in various ways, and may operate in various ways, to perform these and further functions. For instance, FIG. 9 shows a flowchart 900 of a method for providing attestation for a virtual machine and providing an encryption key to the virtual machine, according to an example embodiment. Flowchart 900 may be implemented in HSP circuit 106 by TPM logic 122. For purposes of illustration, flowchart 900 is described with reference to FIGS. 1 and 3-6. Other structural and operational embodiments will be apparent to persons skilled in the relevant art(s) based on the following discussion regarding flowchart 900 and FIGS. 1 and 3-6.

Flowchart 900 of FIG. 9 begins with step 902. In step 902, the TPM logic provides attestation for a configuration state of the first virtual machine to the first virtual machine based on instantiation measurements related to the HSP executable code, the TPM logic, the hypervisor, and the first virtual machine stored in the one or more memory devices of the HSP circuit as the security information related to the first virtual machine. For example, as described above, VM-1 security information 124A stored in NVM 132 may comprise instantiation measurements of HSP executable code 334, TPM logic 122, hypervisor 112, and executable code of VM1-110A. Before allowing an operation to be performed by executable code in VM1-110A, the executable code (e.g., OS code, application code) may utilize the instantiation measurements stored in HSP circuit 106 to verify whether a correct sequence of code related to VM-1 110A has been instantiated and that the system has booted as expected for VM-1 110A. In one example, OS security code of VM-1 110A (e.g., Bitlocker®) may be configured encrypt and/or decrypt a hard drive related to CPU 104 (not shown) utilizing an cryptographic key (e.g., an encryption and/or decryption key) that may be stored as part of VM-1 security information 124A in NVM 132 of HSP circuit 106. If the encryption key were known to an attacker, the attacker may be able to gain access to VM-1 110A and run malicious firmware or early boot code before the OS security code is active. To prevent the attacker from obtaining the encryption key, the OS security code may determine whether the system related to VM-1 110A booted in the way that is expected (a correct sequence) based on instantiation measurements stored as part of VM-1 security information 124A. The expected (or correct) boot sequence (e.g., instantiation measurements) may also be stored in run-time TPM data 310A in CPU 104 and may be known to the OS security code. The OS security code of VM-1 110A may determine whether it is safe to decrypt the hard drive by sending a TPM command requesting the instantiation measurements related VM-1 100A that are stored as part of VM-1 security information 124A. VM-1 110A may send the TPM command via virtualized TPM interface 312A of VM-1 110A, interface to TPM logic 320 and interface to HSP circuit 322 of hypervisor 112, and communication interface 410 of HSP executable code 334 in HSP circuit 106 to TPM logic 122. In response to the command, TPM logic 122 may be configured to return the instantiation measurements related to VM-1 110A to the OS security code in VM-1 110A via hypervisor 112 (e.g., in a reverse path). If the OS security code determines that identities of the instantiated executable code related to VM-1 110A and the order of instantiating the executable code, as indicated in the instantiation measurements received from TPM logic 122, matches the expected identities and order of instantiation (e.g., stored in run-time TPM data 310A), OS security code may be configured to proceed to obtain the encryption key.

In step 904, TPM logic provides an encryption key to the first virtual machine in response to receiving correct authorization data from the first virtual machine, wherein the encryption key and a value of the authorization data are stored in the one or more memory devices of the HSP circuit as the security information related to the first virtual machine. For example, VM-1 110A may send a TPM command via hypervisor 112 to HSP circuit 106 to TPM logic 122 requesting an encryption key for performing the decryption of the hard drive. The TPM command may include authorization data (e.g., a PIN) for allowing the OS security code to access the encryption key stored as part of VM-1 security information 124A. TPM logic 122 may be configured to receive the authorization data from first VM-1 110A and compare it to an authorization data value stored in VM-1 security information 124A. As described above, TPM logic 122 may be configured to distinguish between, and access, data stored for different VMs such as data stored for VM-1 110A (VM-1 security information 124A) versus data stored for VM-2 110B (e.g., VM-2 security information 124B). If the received authorization data matches the stored authorization data value for VM-1 110A, TPM logic 122 may be configured to call communication interface 410 to send the encryption key to the OS security code of VM-1 110A via hypervisor 112. The OS security code of VM-1 110A may store the encryption key in run-time TPM data 310A for use while performing the decryption operations and may expunge the encryption key once the decryption operations are complete (or when VM-1 100A is shut down).

In another embodiment, TPM logic 122 may be configured to create an encryption key for VM-1 110A. For example, a user may request that VM-1 110A activate the OS security code of VM-1 110A (e.g., Bitlocker®) to perform device encryption. The user may enter a command to the OS security code of VM-1 100A to request encryption of a hard drive and to use TPM logic 122 in HSP circuit 106 to protect the encryption key. For example, the first time the OS security code of VM-1 110A requests an encryption key for this OS security code, it may call virtualized TPM interface 312A to send a TPM command to TPM logic 122 via hypervisor 112 to request creation of an encryption key and to protect the encryption key based on authorization data (e.g., PIN protected). Hypervisor 112 may keep track of commands coming from each of the virtual machines (e.g., VM-1 100A and VM-2 100B), and it may serve as an interface between HSP circuit 106 and the software running in the virtual machines. Once hypervisor 112 receives the TPM command, it may call the interface to HSP circuit 106 to forward the TPM command to TPM logic 122 via communication interface 410. The TPM command may include the authorization data (e.g., the PIN) that the user (or the OS security code of VM-1 100A) provided for use with future requests for gaining access to the encryption key stored in HSP circuit 106. In other words, in response to a future request for the encryption key, TPM logic 122 may release the key only when this authorization data is provided with the request, and otherwise, if the authorization data is not provided, TPM logic 122 may refuse the request.

In response to receiving the TPM command from the OS security code of VM-1 110A, TPM command manager 510 may be configured to control key generator 516 to create the encryption key and store the received authorization data and the encryption key in NVM 132 of HSP circuit 106 as part of VM-1 security information 124A. In some embodiments, encryption and/or decryption manager 412 may be configured to encrypt VM-1 security information 124A (comprising the encryption key and authorization data) stored in NVM 132. TPM command manager 510 may return the encryption key and/or a confirmation that the key was created, by calling communication interface 410 to forward the key/confirmation via hypervisor 112 to the OS security code of VM-1 110A. The OS security code may encrypt the hard drive related to CPU 104 utilizing the encryption key and may store the encryption key temporarily in run-time TPM data 310A for use while performing data encryption operations (or until VM-1 110A is shut down). The OS security code may expunge the encryption key when the encryption operations are complete (or before VM-1 110A is shut down). In this example, the hard drive will be encrypted while the VM-1 110A is shut down.

In future operations, TPM logic 122 may only expose the encryption key when the same authorization data is provided. As encryption keys (and measurements) may be stored in HSP circuit 106 in persistent storage (e.g., NVM 132), they may be available throughout the lifetime of a VM (e.g., VM-1 100A or VM-2 100B) and may be available after shutting down the VM and launching it again. For example, when VM-1 110A starts up again, the hard drive may be encrypted already and the OS security code of VM-1 110A may ask the user for the authorization data. If the user provides the correct authorization data, and the OS security code forwards the authorization data to TPM 122 in HSP circuit 106 via hypervisor 112, TPM logic 122 may verify the received authorization data based on the authorization data value stored in NVM 132 (e.g., as VM-1 security information 124A), and may return the encryption key for use by the OS security code of VM-1 110A. OS security code may utilize the encryption key to decrypt the hard drive, and may continue with further operations of the boot process for VM-1 100A using the decrypted data stored in the hard drive.

III. Example Computer System Implementation

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, systems 100A, 100B, 300, 400, 500, and 600 along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SOC), a field programmable gate array (FPGA), an application specific integrated circuit (ASIC), a trusted platform module (TPM), and/or the like. A SOC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 10:
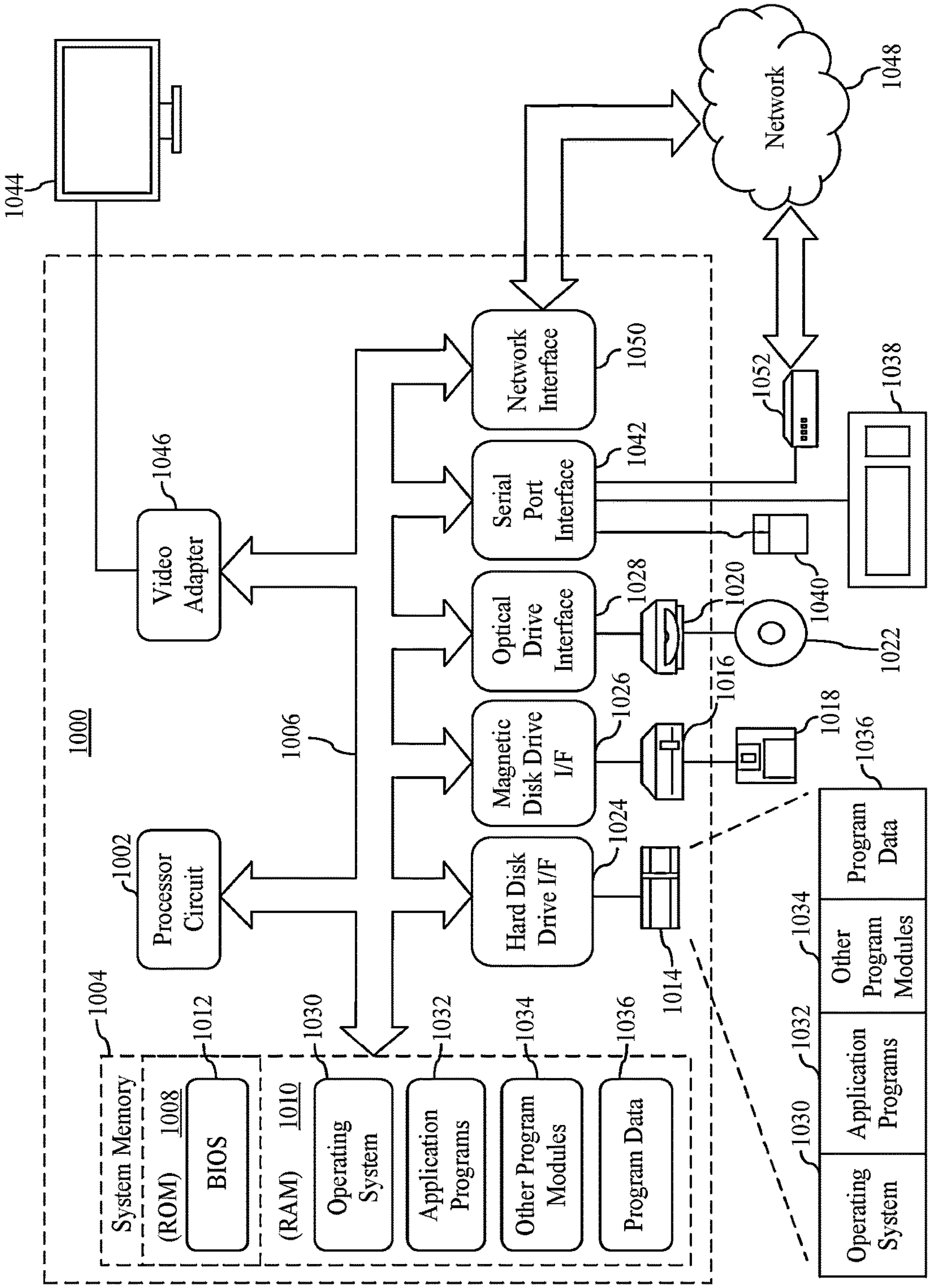
FIG. 10 shows a block diagram of an example processor-based computer system that may be used to implement various embodiments.

FIG. 10 is a block diagram of an example processor-based computer system 1000 that may be used to implement various embodiments. Systems 100A, 100B, 300, 400, 500, and 600 may each include any type of computing device, mobile or stationary, such as a desktop computer, a server, a video game console, etc. For example, 100A, 100B, 300, 400, 500, and 600 may each comprise any type of mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™, Oculus Rift® by Oculus VR, LLC, etc.), a stationary computing device such as a desktop computer or PC (personal computer), a gaming console/system (e.g., Microsoft Xbox®, Sony PlayStation®, Nintendo Wii® or Switch®, etc.), etc.

Systems 100A, 100B, 300, 400, 500, and 600, may each be implemented in one or more computing devices containing features similar to those of computing device 1000 in stationary or mobile computer embodiments and/or alternative features. The description of computing device 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random-access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMS, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing SOC 102, CPU 104, HSP circuit 106, VM-1 110A, VM-2 110B, hypervisor 112, HSP processor 120, TPM logic 122, discrete chip 118, secure encrypted channel 142, HSP code measurement recorder 332, HSP executable code 334, second measurement recorder 336, communication interface 410, encryption and/or decryption manager 412, TPM command manager 510, authentication and/or attestation manager 514, and key generator 516, and any one or more of flowcharts 200, 700, 800, and 900 (including any step thereof), and/or further embodiments described herein. Program data 1036 may include VM-1 security data 124A, VM-2 security data 124B, run-time TPM data 310A, run-time TPM data 310B, VM-1 instantiation measurements 610, VM-2 instantiation measurements 612, encryption keys, and authorization data, and/or further embodiments described herein.

A user may enter commands and information into computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

In one embodiment, a hardware security platform (HSP) circuit comprises one or more processors and one or more memory devices where the one or more memory devices store program code to be executed by the one or more processors. The program code comprises HSP executable code configured to communicate with a hypervisor. The hypervisor is configurable to generate and manage one or more virtual machines. The HSP program code further comprises trusted platform module (TPM) logic configured to process TPM commands received via the hypervisor. In response to the processing, the TPM logic may communicate security information with the one or more virtual machines via the hypervisor. The TPM logic may further receive, from the hypervisor, security information related to a first virtual machine of the one or more virtual machines and store the security information related to the first virtual machine in non-volatile memory of the HSP circuit.

In an embodiment of the foregoing HSP circuit, the TPM logic is further configured to communicate with the one or more virtual machines via the hypervisor and one or more respective virtualized TPM interfaces in the one or more virtual machines.

In an embodiment of the foregoing HSP circuit, the TPM logic is further configured to receive, from the hypervisor, security information related to a second virtual machine of the one or more virtual machines, and store, in non-volatile memory of the HSP circuit, the security information related to the second virtual machine distinguishable from the security information related to the first virtual machine.

In an embodiment of the foregoing HSP circuit, the security information comprises at least one of instantiation measurements, encryption keys, or authorization data.

In an embodiment of the foregoing HSP circuit, the security information of the first virtual machine of the plurality of virtual machines comprises instantiation measurements. the TPM logic is further configured to receive, from the hypervisor, a sequence of instantiation measurements related to the first virtual machine of the one or more virtual machines and store, in non-volatile memory of the HSP circuit, each measurement of the sequence of instantiation measurements related to the first virtual machine as a measurement extension relative to a prior measurement of the sequence.

In an embodiment of the foregoing HSP circuit, an HSP measurement recorder is configured to instantiate HSP executable code and store, in the non-volatile memory of the HSP circuit, a measurement of the HSP executable code instantiation. The HSP executable code is further configured to instantiate the TPM logic and store, in the non-volatile memory of the HSP circuit, a measurement of the TPM logic instantiation. The TPM logic instantiation measurement is stored as an extension of the HSP executable code instantiation measurement, and a measurement of the sequence of instantiation measurements related to the first virtual machine is stored as measurement extension relative to the instantiation measurements of the HSP executable code and the TPM logic.

In an embodiment of the foregoing HSP circuit, where the hypervisor is instantiated in a processor coupled to the HSP circuit, the hypervisor instantiates the first virtual machine in the processor, and hypervisor instantiation measurements are included in instantiation measurements related to the first virtual machine of the one or more virtual machines received from the hypervisor.

In an embodiment of the foregoing HSP circuit, the TPM logic is further configured to receive, from the hypervisor, authorization data corresponding to the first virtual machine, and in response, store the authorization data for the first virtual machine in the HSP non-volatile memory distinguishable from authorization data for the second virtual machine.

In an embodiment of the foregoing HSP circuit, the TPM logic is further configured to provide attestation for a configuration state of the first virtual machine to the first virtual machine based on instantiation measurements related to the HSP executable code, the TPM logic, the hypervisor, and the first virtual machine stored in the one or more memory devices of the HSP circuit as the security information related to the first virtual machine, and provide an encryption key to the first virtual machine in response to receiving correct authorization data from the first virtual machine, where the encryption key and a value of the authorization data are stored in the one or more memory devices of the HSP circuit as the security information related to the first virtual machine.

In one embodiment, a method for virtualizing trusted platform module (TPM) logic in a hardware security platform (HSP) circuit to a virtual machine. The method comprises configuring HSP executable code to communicate with a hypervisor, where the hypervisor is configurable to generate and manage one or more virtual machines. The method further comprises processing, by the TPM logic, TPM commands received via the hypervisor, and in response to said processing, communicate, by the TPM logic, security information with the one or more virtual machines via the hypervisor. The method further comprises receiving, by the TPM logic, from the hypervisor, security information related to a first virtual machine of the one or more virtual machines and storing, by the TPM logic, in non-volatile memory of the HSP circuit, the security information related to the first virtual machine.

In an embodiment of the foregoing method, the TPM logic communicates with the one or more virtual machines via the hypervisor and one or more respective virtualized TPM interfaces in the one or more virtual machines.

In an embodiment of the foregoing method, the TPM logic receives, from the hypervisor, security information related to a second virtual machine of the one or more virtual machines and stories, in non-volatile memory of the HSP circuit, the security information related to the second virtual machine distinguishable from the security information related to the first virtual machine.

In an embodiment of the foregoing method, the security information comprises at least one of instantiation measurements, encryption keys, or authorization data.

In an embodiment of the foregoing method, the security information of the first virtual machine of the plurality of virtual machines comprises instantiation measurements. The method further comprises receiving, by the TPM logic, from the hypervisor, a sequence of instantiation measurements related to the first virtual machine of the one or more virtual machines and storing, by the TPM logic in non-volatile memory of the HSP circuit, each measurement of the sequence of instantiation measurements related to the first virtual machine as a measurement extension relative to a prior measurement of the sequence.

In an embodiment of the foregoing method, an HSP measurement recorder instantiates the HSP executable code and stores, in the non-volatile memory of the HSP circuit, a measurement of the HSP executable code instantiation. The HSP executable code instantiates the TPM logic and the HSP executable code stores, in the non-volatile memory of the HSP circuit, a measurement of the TPM logic instantiation. The TPM logic instantiation measurement is stored as an extension of the HSP executable code instantiation measurement. A measurement of the sequence of instantiation measurements related to the first virtual machine is stored as measurement extension relative to the instantiation measurements of the HSP executable code and the TPM logic.

In an embodiment of the foregoing method, the hypervisor is instantiated in a processor coupled to the HSP circuit, the hypervisor instantiates the first virtual machine in the processor, hypervisor instantiation measurements are included in instantiation measurements related to the first virtual machine of the one or more virtual machines received from the hypervisor.

In an embodiment of the foregoing method, the TPM logic receives, from the hypervisor, authorization data corresponding to the first virtual machine. In response to the receiving, the TPM logic stores the authorization data for the first virtual machine in the HSP non-volatile memory distinguishable from authorization data for the second virtual machine.

In an embodiment of the foregoing method, the TPM logic provides attestation for a configuration state of the first virtual machine to the first virtual machine based on instantiation measurements related to the HSP executable code, the TPM logic, the hypervisor, and the first virtual machine stored in the one or more memory devices of the HSP circuit as the security information related to the first virtual machine. The TPM logic provides an encryption key to the first virtual machine in response to receiving correct authorization data from the first virtual machine. The encryption key and a value of the authorization data are stored in the one or more memory devices of the HSP circuit as the security information related to the first virtual machine.

In one embodiment, a system for virtualizing trusted platform module (TPM) logic in a hardware security platform (HSP) circuit to a virtual machine comprises a first circuitry comprising one or more processors and one or more memory devices. The one or more memory devices store program code to be executed by the one or more processors. The program code comprises a hypervisor configurable to generate and manage one or more virtual machines and communicate TPM security information to the TPM logic in a second circuitry. The second circuitry comprises one or more processors and one or more memory devices that store program code to be executed by the one or more processors. The program code of the second circuitry comprises HSP executable code configured to communicate with the hypervisor and TPM logic. The TPM logic is configured to process TPM commands received via the hypervisor. In response to the processing, the TPM logic communicates security information with the one or more virtual machines via the hypervisor. The TPM logic receives, from the hypervisor, TPM security information related to a first virtual machine of the one or more virtual machines and stores, in non-volatile memory of the HSP circuit, the TPM security information related to the first virtual machine. The stored TPM security information of the first virtual machine is distinguishable from TPM security information related to a second virtual machine stored in the non-volatile memory of the HSP.

In an embodiment of the foregoing system, the TPM logic is further configured to communicate with the one or more virtual machines via the hypervisor and one or more respective virtualized TPM interfaces in the one or more virtual machines.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A hardware security platform (HSP) circuit comprising:
a processor; and
a memory comprising:
  HSP executable code configured to:
    communicate with one or more virtual machines executed in a separate processor coupled to the HSP circuit;
    instantiate trusted platform module (TPM) logic; and
    store, in non-volatile memory of the HSP circuit, a measurement of the TPM logic instantiation;
  an HSP measurement recorder configured to:
    instantiate the HSP executable code; and
    store, in the non-volatile memory, a measurement of the HSP executable code instantiation, wherein the measurement of the TPM logic instantiation is stored as an extension of the measurement of the HSP executable code instantiation.

2. The HSP circuit of claim 1, wherein the TPM logic is configured to:

receive security information related to the one or more virtual machines; and store, in the non-volatile memory, the security information.

3. The HSP circuit of claim 2, wherein the security information comprises instantiation measurements.

4. The HSP circuit of claim 3, wherein the TPM logic is further configured to:

receive a sequence of the instantiation measurements; and store, in the non-volatile memory, each measurement of the sequence of instantiation measurements as a measurement extension relative to a prior measurement of the sequence.

5. The HSP circuit of claim 4, wherein a measurement of the sequence of instantiation measurements is stored as measurement extension relative to the measurement of the TPM logic instantiation and the measurement of the HSP executable code instantiation.

6. The HSP circuit of claim 1, wherein the TPM logic is configured to:

receive a TPM command from the one or more virtual machines, the TPM command requesting attestation of the one or more virtual machines.

7. The HSP circuit of claim 6, wherein the TPM logic is further configured to:

process the TPM command by retrieving instantiation measurements for the one or more virtual machines, the instantiation measurements for the one or more virtual machines being stored by the HSP circuit.

8. The HSP circuit of claim 7, wherein the TPM logic is further configured to:

provide the instantiation measurements for the one or more virtual machines to the one or more virtual machines.

9. The HSP circuit of claim 7, wherein the instantiation measurements for the one or more virtual machines include measurements for hypervisor firmware for a hypervisor configured to manage the one or more virtual machines.

10. The HSP circuit of claim 1, wherein storing, in the non-volatile memory, the measurement of the HSP executable code instantiation comprises storing the measurement of the HSP executable code instantiation in a platform configuration register (PCR) in the non-volatile memory.

11. The HSP circuit of claim 1, wherein storing the measurement of the TPM logic instantiation as an extension of the measurement of the HSP executable code instantiation comprises:

generating a sum of the measurement of the TPM logic instantiation and a value associated with the measurement of the HSP executable code instantiation.

12. The HSP circuit of claim 11, wherein storing the measurement of the TPM logic instantiation as an extension of the measurement of the HSP executable code instantiation further comprises:

creating a hashed sum by applying a hash algorithm to the sum; and storing the hashed sum in a platform configuration register (PCR) in the non-volatile memory.

13. A method comprising:

instantiating hardware security platform (HSP) executable code of a HSP circuit comprising a memory device;

storing, in non-volatile memory of the memory device, a measurement of instantiating the HSP executable code;

instantiating trusted platform module (TPM) logic; and storing, in the non-volatile memory, a measurement of instantiating the TPM logic, wherein the measurement of instantiating the TPM logic is stored as an extension of the measurement of instantiating the HSP executable code.

14. The method of claim 13, further comprising:

creating a first hashed value by applying a hash algorithm to the measurement of instantiating the HSP executable code; and storing the first hashed value in a first platform configuration register (PCR) of the HSP circuit.

15. The method of claim 14, further comprising:

generating a first sum of the first hashed value and the measurement of instantiating the TPM logic;

creating a second hashed value by applying the hash algorithm to the first sum; and storing the second hashed value in a second PCR of the HSP circuit.

16. The method of claim 15, further comprising:

generating a second sum of the second hashed value and instantiation measurements of a hypervisor that manages one or more virtual machines executed in a processor coupled to the HSP circuit;

creating a third hashed value by applying the hash algorithm to the second sum; and storing the third hashed value in a third PCR of the HSP circuit.

17. The method of claim 13, wherein the TPM logic is configured to communicate with one or more virtual machines via a virtualized TPM interface of the one or more virtual machines.

18. The method of claim 17, wherein the TPM logic is configured to:

receive security information related to the one or more virtual machines; and store, in the non-volatile memory, the security information.

19. The method of claim 18, wherein the security information comprises at least one of encryption keys or authorization data.

20. A system comprising:

a processor;

a memory device storing program code that, when executed, performs operations comprising:

instantiating hardware security platform (HSP) executable code of a HSP circuit comprising a memory device;

storing, in non-volatile memory of the memory device, a measurement of instantiating the HSP executable code;

instantiating trusted platform module (TPM) logic; and storing, in the non-volatile memory, a measurement of instantiating the TPM logic, wherein the measurement of instantiating the TPM logic is stored as an extension of the measurement of instantiating the HSP executable code.

* * * * *